United States Patent
Kim et al.

(10) Patent No.: US 7,104,651 B2
(45) Date of Patent: Sep. 12, 2006

(54) COLOR SCROLLABLE PROJECTION SYSTEM

(75) Inventors: Dae-sik Kim, Suwon-si (KR); Kun-ho Cho, Suwon-si (KR); Sung-ha Kim, Seoul (KR); Hee-joong Lee, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/811,145

(22) Filed: Mar. 29, 2004

(65) Prior Publication Data

US 2004/0246443 A1    Dec. 9, 2004

Related U.S. Application Data

(60) Provisional application No. 60/457,919, filed on Mar. 28, 2003.

(30) Foreign Application Priority Data

May 24, 2003 (KR) .................... 10-2003-0033240

(51) Int. Cl.
| | |
|---|---|
| G03B 21/00 | (2006.01) |
| G03B 21/20 | (2006.01) |
| G03B 21/28 | (2006.01) |
| G02B 26/08 | (2006.01) |
| G02B 27/14 | (2006.01) |
| H04N 5/74 | (2006.01) |
| G02F 1/1335 | (2006.01) |

(52) U.S. Cl. ........................... 353/31; 353/37; 353/84; 353/99; 353/102; 359/201; 359/205; 359/210; 359/634; 348/759; 349/7

(58) Field of Classification Search ................ 353/30, 353/20, 31–34, 37, 84, 97, 98, 99, 101, 102, 353/81, 618, 627, 629, 634, 638–640; 348/742, 348/743, 759, 744, 771; 349/5, 7–9; 359/196, 359/197, 201, 205, 209, 210
See application file for complete search history.

(56) References Cited

U.S. PATENT DOCUMENTS

| 6,288,815 B1 * | 9/2001 | Lambert .................... 359/196 |
| 6,839,095 B1 * | 1/2005 | Bierhuizen et al. ............ 349/9 |
| 2002/0135862 A1 * | 9/2002 | Dewald ....................... 359/298 |

(Continued)

FOREIGN PATENT DOCUMENTS

JP    11-281930 A    10/1999

(Continued)

Primary Examiner—W. B. Perkey
Assistant Examiner—Rochelle Blackman
(74) Attorney, Agent, or Firm—Sughrue Mion, PLLC

(57) ABSTRACT

A color scrolling projection system is provided, including a light source, a color separator, a color scanner, a light valve, and a control circuit. The light source generates and emits light. The color separator separates incident light according to color. The color scanner includes a scrolling unit and a driving source for rotating the scrolling unit. The scrolling unit includes at least one lens cell and converts the rotation of the scrolling unit into the rectilinear motion of a lens array of the scrolling unit through which light passes. The light valve processes color bars according to an input image signal and forms a color image. The control circuit synchronizes the scrolling of the color with the electrical scanning of the light valve according to an image signal. The color bars are scrolled on the light valve due to a rotation of the scrolling unit.

16 Claims, 8 Drawing Sheets

U.S. PATENT DOCUMENTS

| | | |
|---|---|---|
| 2002/0149748 A1 | 10/2002 | Janssen et al. |
| 2002/0191154 A1 | 12/2002 | Shahzad et al. |
| 2003/0030776 A1 | 2/2003 | Jeon |
| 2005/0213045 A1* | 9/2005 | Taoka et al. .................. 353/31 |

FOREIGN PATENT DOCUMENTS

| | | |
|---|---|---|
| KR | 1999-002347 A | 1/1999 |

* cited by examiner

COLOR SCROLLABLE PROJECTION SYSTEM

BACKGROUND OF THE INVENTION

This application claims the priority of Korean Patent Application No. 2003-33240, filed on May 24, 2003, in the Korean Intellectual Property Office, and the benefit of U.S. Patent Provisional Application No. 60/457,919, filed on Mar. 28, 2003, in the U.S. Patent and Trademark Office, the disclosures of which are incorporated herein in their entirety by reference.

FIELD OF THE INVENTION

The present invention relates to a projection system, and more particularly, to a color scrollable projection system.

DESCRIPTION OF THE RELATED ART

In conventional projection systems which deliver image information to people, a light valve, such as a liquid crystal display (LCD) or a Digital Micro-mirror Device (MD), is used to perform switching for high-speed information processing. The light valve controls the on/off operation of light emitted from a light source (e.g., a high output lamp) on a pixel-by-pixel basis and forms a picture. A magnifying projection optical system provides the picture to a large screen. Projection systems are classified as either 3-panel projection systems or single-panel projection systems, according to the number of light valve panels used. Designers of projection systems have tried to provide a high luminance for a large screen while using a single panel in order to overcome the problems associated with complicated and expensive optical systems.

In conventional single-panel color projection systems, white light radiated from a white light source is separated into R, G, and B color beams using a color wheel, and the three color beams are sequentially transmitted to a single light valve. The light valve operates and creates images according to the sequence of received color beams.

These general single-panel color projection systems have smaller optical systems than do three-panel color projection systems, in which different colors are obtained using an optical separation/combination system and in which images of different colors are created using three light valves. However, these single-panel color projection systems provide only ⅓ of the optical efficiency of the three-panel color projection systems because a color wheel is used.

A color scrolling method has been designed to increase the optical efficiency of single-panel color projection systems. The use of the color scrolling method enables a single-panel color projection system to have the light efficiency of a three-panel color projection system.

According to the color scrolling method, white light is separated into R, G, and B color beams, and the three color beams are simultaneously sent to different locations on a light valve to form R, G, and B color bars. Since an image cannot be produced until each of the R, G, and B color beams reach each of the pixels of the light valve, the color bars are moved at a constant speed by a color scrolling means.

FIG. 1 shows a conventional color scrolling projection system, as disclosed in International Publication No. WO 02/085031 A1. As shown in FIG. 1, light emitted from a light source 12 is separated into first, second, and third color beams (i.e., R, G, and B color beams) by a color separator 14. The first, second, and third color beams travel along paths 15a, 15b, and 15c, respectively. Scanners 16a, 16b, and 16c are installed in the paths 15a, 15b, and 15c, respectively. Reference numeral 18 denotes a color combiner, and reference numeral 20 denotes a polarization beam splitter.

Each of the scanners 16a, 16b, and 16c includes a prism (not shown) installed on the shaft of a motor (not shown). When the prism is rotated by the motor, R, G, and B color bars formed on a light valve 22 are scrolled.

As described above, when three prisms are rotated, the R, G, and B color bars move on the light valve 22. When picture information for each pixel of the light valve 22 is processed in synchronization with a motion of the R, G, and B color bars, a color image is formed. The color image is magnified by a projection lens 24 and projected onto a screen 10.

Since the conventional single-panel projection system individually rotates three prisms to perform color scrolling, the light valve 22 must be driven in synchronization with the scrolling of the R, G, and B color bars depending on a rotation of three separate prisms. Therefore, controlling the synchronization is not easy. Further, because the prisms make circular motions, the color scrolling speed of the prisms is irregular, consequently deteriorating the quality of the resultant image.

In addition, a lot of noise is generated by the three motors which rotate the three prisms. Also, the manufacturing costs of the above-described conventional color scrolling projection system are higher than those of a projection system utilizing a color wheel with only one motor.

Also, since the above-described conventional color scrolling projection system utilizes different light paths for different colors and further includes a component for re-combining the different colors, the optical system is larger, and the assembly thereof is complicated.

SUMMARY OF THE INVENTION

The present invention provides a color scrolling projection system which can be made more compact and can easily scroll a plurality of color bars in synchronization with an image signal applied to a light valve because the color bars are scrolled at a constant speed by using a single scrolling unit.

The color scrolling projection system includes a light source, a color separator, a color scanner, a light valve, and a control circuit. The light source generates and emits light. The color separator separates an incident light beam according to color. The color scanner includes a scrolling unit and a driving source for rotating the scrolling unit so that a plurality of color bars are scrolled. The scrolling unit includes at least one lens cell and converts a rotation of the at least one lens cell into the rectilinear motion of an area of the lens cell through which light passes. The light valve processes a plurality of color bars separated by the color separator and scrolled by the color scanner according to an input image signal and forms a color image. The control circuit performs optical scanning of at least one of a plurality of color bars in phase with an electrical scanning of the light valve by an image signal. The color bars are formed on the light valve due to a rotation of the scrolling unit.

The control circuit may include a driving source controller which controls the driving source so that the optical scanning of the at least one color bar is in phase with the electrical scanning. This is accomplished by changing the rotation of the driving source according to a phase offset value which represents a phase difference between the optical scanning and the electrical scanning.

The control circuit may further include a reference phase generator which generates a reference phase signal and provides the reference phase signal to the light valve. The electrical scanning of the light valve may be performed based on the reference phase signal, and the phase offset value may be determined based on the reference phase signal.

The phase offset value may be determined by the steps of: electrically scanning image information for all colors on the light valve based on the reference phase signal; scanning the plurality of color bars on the light valve based on the reference phase signal; and adjusting the scanning phase of the color bars on the light valve until each color bar is modulated only by image information corresponding to that specific color.

The phase offset value may be stored in a non-volatile memory so as to be able to be accessed by the driving source controller.

The at least one lens cell of the scrolling unit may be spirally formed.

The at least one lens cell of the scrolling unit may be a cylindrical lens.

The scrolling unit may be a disk.

The number of spiral lens cells may be at least four.

When the scrolling unit rotates, an area of a lens array through which light passes may move towards or away from a rotation center of the scrolling unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 2:
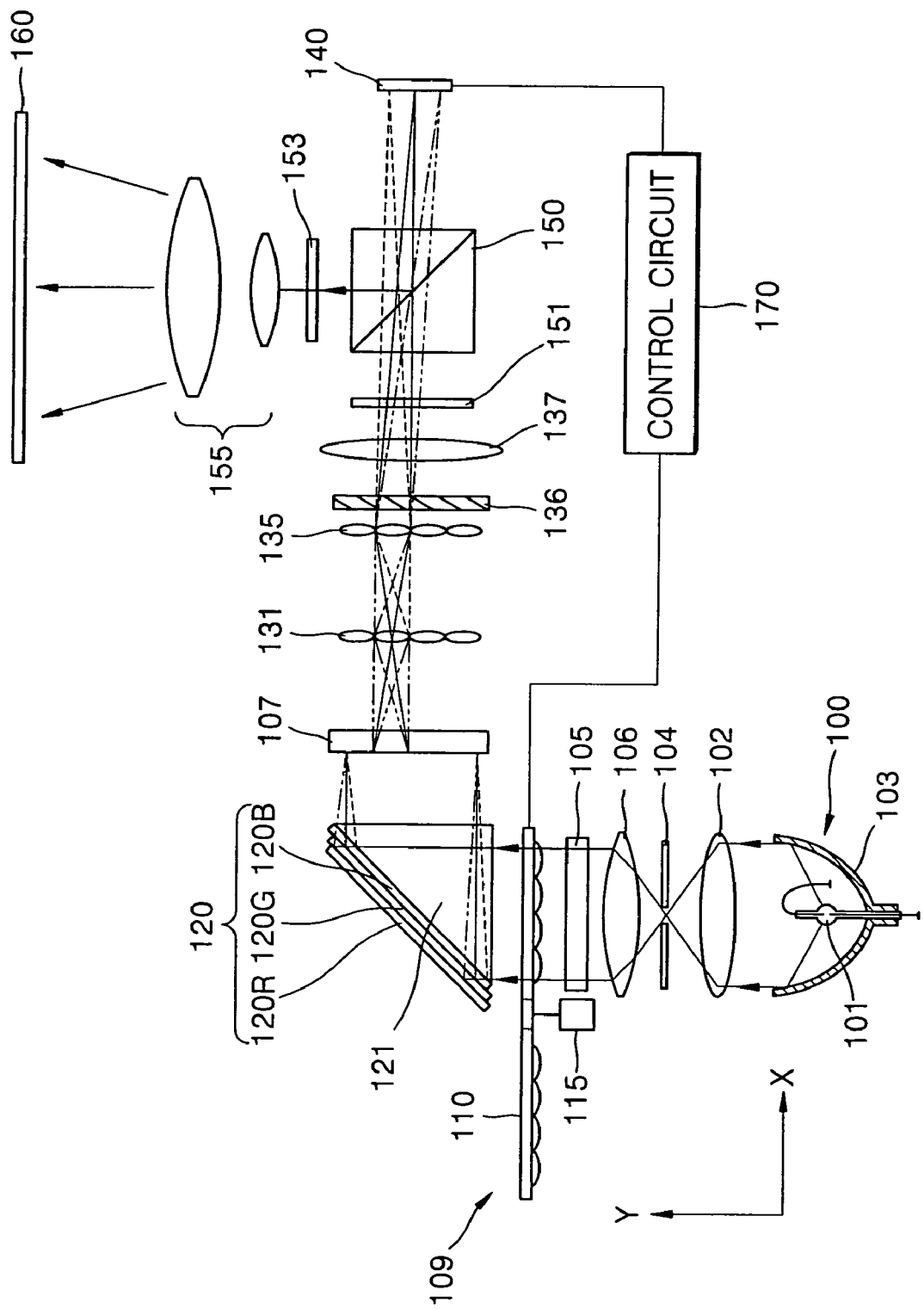
FIG. 2 is a schematic diagram of a color scrolling projection system according to an exemplary embodiment of the present invention.

Referring to FIG. 2, a projection system according to an exemplary embodiment of present invention comprises a light source 100, a color separator 120, a color scanner 109, a light valve 140, and a control circuit 170. The light source 100 emits light, and the color separator 120 separates incident light according to color. The color scanner 109 includes a scrolling unit 110, which scrolls a plurality of color bars, and a driving source 115, which rotates the scrolling unit 110. The light valve 140 processes incident light according to a received image signal, thereby forming a color image. The control circuit 170 controls optical scanning of at least one of a plurality of color bars formed on the light valve 140 due to the rotation of the scrolling unit 110, so that the optical scanning is maintained in phase with the electrical scanning of the light valve 140, which is controlled by an input image signal. The light source 100, the color separator 120, and the color scanner 109 constitute an illumination system.

The light source may be a lamp which emits white light. The light source 100, as illustrated, comprises a lamp 101, for generating approximately unpolarized white light, and a reflection mirror 103, for reflecting the light emitted from the lamp 101 and for guiding the path of the reflected light. The reflection mirror 103 may be an elliptical mirror whose first focal point is the position of the lamp 101 and whose second focal point is a point where light is focused. Alternatively, the reflection mirror 103 may be a parabolic mirror which collimates the light emitted from the lamp 101 and transmits parallel light. The reflection mirror 103 shown in FIG. 2 is a parabolic mirror.

In this case, that is, when approximately parallel light is emitted from the light source 100, a lens 102 for focusing the parallel light, is also included.

The illumination system further comprises a collimating lens 106 for collimating light that is focused by the lens 102 and then diverges.

The collimating lens 106 is used to reduce the diameter of a light beam emitted from the light source and is disposed so that a light beam transmitted by the collimating lens 106 has a diameter of about ⅕ of the diameter of the light beam emitted from the light source 100. The installation of the collimating lens 106 contributes to the overall miniaturization of the optical system.

A spatial filter 104, having a slit therein, is further disposed on the light path between the light source 100 and the collimating lens 106 so as to adjust the divergence angle (or etendue) of light emitted from the light source 100. The spatial filter 104 is preferably, but not necessarily, installed at the focal point of the lens 102. Also, preferably, but not necessarily, the spatial filter 104 is formed so that the width of the slit can be adjusted in a color separation direction or a color scrolling direction.

When the reflective mirror 103 is an elliptical mirror, convergent light emitted from the light source 100 is focused at the second focal point of the elliptical mirror 103 and then diverges. Hence, in this case, the lens 102 is not used. The collimating lens 106, for collimating the diverged light, is disposed so that a beam emitted from the collimating lens 106 has a diameter of about ⅕ of the diameter of the beam emitted from the light source 100. The spatial filter 104 is located at the second focal point of the elliptical mirror 103.

When the etendue of the optical system or the divergence angle of the incident light is adjusted by the spatial filter 104 as described above, color bars can be accurately separated to thereby improve the quality of the resultant image. Light from the light source 100, which diverges at an angle grater than an acceptance angle of the optical system may cause the color bars to be partially overlapped. Hence, the spatial filter 204 blocks light divergent at an angle greater than the acceptance angle of the optical system, whereby the color bars can be adequately separated.

When a liquid crystal display (LCD) is used as the light valve 140, an image signal can be smoothly processed by adjusting the width of the slit of the spatial filter 104, thereby reducing the size of the color bars and forming black bars. More specifically, when an LCD is used as the light valve 140 and color bars are consecutively scrolled, the LCD may not be able to consecutively process image signals that change every time the color bars are changed. In this case, a period of time is required between color bars in order to process each of the image signals. To obtain this period of time, black bars are needed between adjacent color bars. The black bars can be obtained by adequately adjusting the width of the slit of the spatial filter 104.

Etendue denotes an optical conservation quantity in an optical system. Given that a starting point of the optical system is the light source 100 and the object of the optical system is the light valve 140, when the etendue of the light source 100 is greater than that of the entire optical system, the size of color bars is increased. Hence, colors may mix at the boundaries between color bars. On the other hand, when the etendue of the light source 100 is smaller than that of the entire optical system, the size of the color bars is decreased, and thus, black bars form between adjacent color bars. Since the spatial filter 104 can adjust the etendue, color mixture at the boundaries between color bars can be prevented, and black bars can be formed between adjacent color bars.

The spatial filter 104 may have a different structure depending on its purpose. For example, the spatial filter 104 may be constructed to independently adjust the size of each of the color bars, thereby improving a color gamut and adjusting a color balance.

The color separator 120 comprises a plurality of dichroic filters, namely, first, second, and third dichroic filters 120B, 120G, and 120R, for separating white light radiated from the light source 100 according to wavelength.

FIG. 2 shows an example in which the color separator 120 comprises first, second, and third dichroic filters 120B, 120G, and 120R, for reflecting a blue (B) beam, a green (G) beam, and a red (R) beam, respectively, so that white light radiated from the light source 100 is separated into B, G, and R beams. In FIG. 2, the first, second, and third dichroic filters 120B, 120G, and 120R of the color separator 120 are installed parallel to one another. However, the color separator 120 may have a different structure.

The first, second, and third dichroic filters 120B, 120G, and 120R of the color separator 120 may be disposed aslant at different angles with respect to each other. Also, the color separator 120 may be replaced by an optical pipe which comprises a plurality of dichroic prisms, each of which includes a dichroic filter installed at an angle with respect to light emitted from the light source 100 and reflects an incident color beam.

Also, in FIG. 2, a prism 121 is additionally included to transfer incident light to the color separator 120 without changing the path of the light. The prism 121 is optional.

The color separator 120 including the first, second, and third dichroic filters 120B, 120G, and 120R receives white light from the light source 100. The first dichroic filter 120B reflects a B beam from the white light and transmits a residual beam of R and G light. The second dichroic filter 120G reflects the G beam from the beam transmitted by the first dichroic filter 120B and transmits the R beam. The third dichroic filter 120R reflects the R beam transmitted by the second dichroic filter 120G.

The sequence in which the first, second, and third dichroic filters 120B, 120G, and 120R are arranged may vary.

The interval between adjacent dichroic filters 120B, 120G, and 120R is determined so that the B, G, and R beams transmitted by the color separator 120 are incident on a first fly eye lens 131 without mixing with one another.

The projection system according to the present invention utilizes a single panel and a color scrolling technique, thereby obtaining the light efficiency of a three-panel projection system.

According to the color scrolling technique, white light is separated into a plurality of color beams, for example, R, G, and B beams. The color beams are simultaneously sent to different locations on the light valve 140 to form a plurality of color bars. The color bars are scrolled at a constant speed so that a plurality of color beams can reach each pixel of the light valve 140, thereby forming a color image.

When the white light is separated into the R, G, and B beams, the R, G, and B color bars must reach different areas each corresponding to about ⅓ of the entire area of the light valve 140. Also, since an image cannot be produced until all of the R, G, and B color beams reach each pixel of a light valve, the color bars must be moved at a constant speed by a color scrolling means.

The projection system of the present invention includes the single color scanner 109, which includes the driving source 115 for driving color scrolling and the scrolling unit 110, installed on the shaft of the driving source 115.

Also, the projection system of the present invention further includes first and second fly-eye lenses 131 and 135 disposed on the light path between the scrolling unit 110 and the light valve 140. A relay lens 137 is further installed between the second fly-eye lens 135 and the light valve 140.

Figure 3:
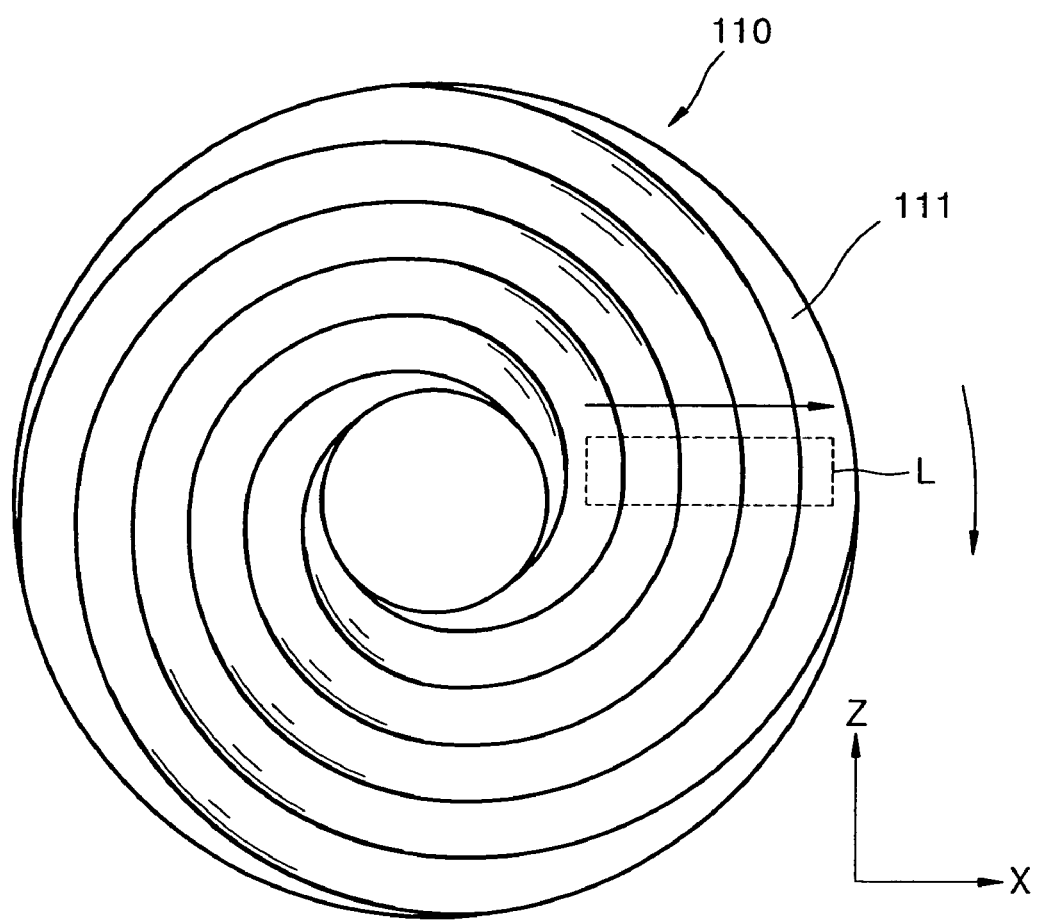
FIG. 3 is a front view of the scrolling unit of FIG. 2.

Furthermore, the projection system of the present invention includes first and second cylindrical lenses 105 and 107, respectively disposed in front of and behind the scrolling unit 110. The first cylindrical lens 105 reduces the width of an incident light beam so that a beam incident upon the scrolling unit 110 has a box-shaped cross-section as shown in FIG. 3. Accordingly, as will be described later, light loss is reduced, and the beam transmitted by the scrolling unit 110 is restored to its original width by the second cylindrical lens 107.

As illustrated in FIG. 3, the scrolling unit 110 comprises at least one lens cell 111. The scrolling unit 110 scrolls a plurality of color beams by converting the rotation of the lens cells 111 into the rectilinear motion of a lens array defined by an area of the lens cells 111 through which light passes.

In FIG. 3, the scrolling unit 110 is a disk on which the at least one lens cell 111 is spirally arranged to obtain an effect where a lens array of the lens cells 111 rectilinearly moves during a rotation of the scrolling unit 110.

As shown in FIG. 3, when an array of spiral lens cells 111 is formed at the disk type scrolling unit 110, the lens cells 111 are preferably disposed at equal intervals and have identical cross-sections.

Figure 4:
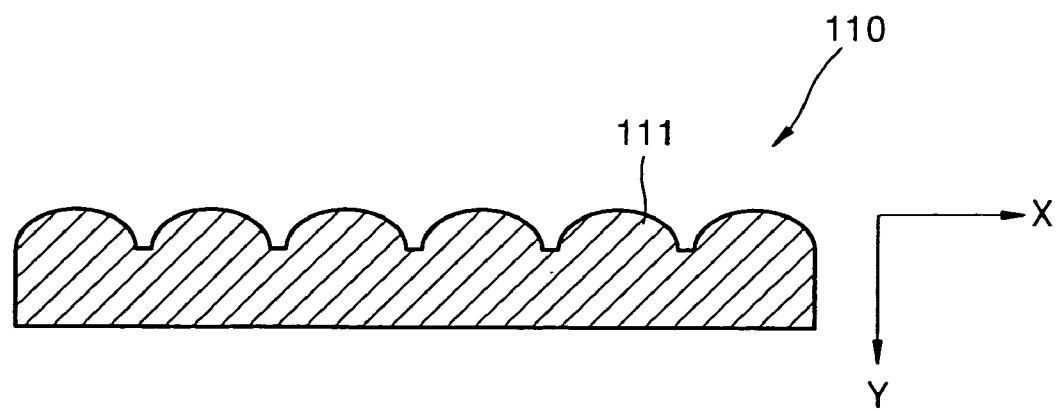
FIG. 4 is a cross-section of lens cells of the scrolling unit of FIG. 2.

As shown in FIG. 4, the spiral lens cells 111 of the scrolling unit 110 may be cylindrical lens cells having circular arc cross-sections. Alternatively, the lens cells 111 of the scrolling unit 110 may be diffraction optical elements or hologram optical elements.

Each of the lens cells 111 of the scrolling unit 110 focuses light radiated from the light source 100 and scrolls color bars with a rotation of the scrolling unit 110.

When the scrolling unit 110 including the spiral lens cells 111 is rotated by the driving source 115, the rotation of the spiral lens cells 111 is converted into a rectilinear motion of the lens array so that scrolling is performed.

More specifically, since the lens cells 111 are spirally arranged, when the disk type scrolling unit 110 is rotated clockwise at a constant speed, it appears from the point of view of the beam L that the cylindrical lens array rectilinearly moves outward at a constant speed. By rotating the scrolling unit in a counter-clockwise direction, the cylindrical lens array appears to move inward.

Since the beam L, whose width is reduced by the first cylindrical lens 105 passes through the scrolling unit 110 as illustrated in the box of FIG. 3, an effect can be obtained whereby the light appears to pass through a lens array that moves rectilinearly.

Therefore, when the scrolling unit 110 rotates at a constant speed, the R, G, and B beams obtained by the color separator 120 are repeatedly scrolled, thus scrolling the color bars on the light valve 140.

In the present invention, scrolling is performed by continuously rotating the scrolling unit 110 in one direction without changing the rotation direction, thereby guaranteeing continuous and consistent color scrolling. In addition, since the single scrolling unit 110 can scroll a plurality of color bars, the scrolling speed of the color bars is kept constant.

As will be described later, the scrolling unit 110 of the projection system of the present invention preferably, but not necessarily, has four or more spiral lens cells 111 so as to reduce the rotating speed of the driving source 115 compared with a conventional color wheel type projection system or a color scrolling projection system using prisms.

The number of spiral lens cells 111 on the scrolling unit 110 and the rotation speed of the scrolling unit 110 can be adjusted to synchronize the scrolling unit 110 with the operating frequency of the light valve 140. That is, when the operating frequency of the light valve 140 is high, more lens cells 111 may be included to increase the scrolling speed while keeping the rotation speed of the scrolling unit 110 constant. Conversely, the scrolling speed can also be increased by maintaining the original number of lens cells 111, but increasing the rotation frequency of the scrolling unit 110.

Referring to FIG. 2, the projection system according to the present invention includes the scrolling unit 110, which comprises a single disk. However, the scrolling unit 110 may be replaced by a scrolling unit 110', which comprises a plurality of disks, on each of which at least one lens cell is formed as shown in FIG. 5.

Figure 5:
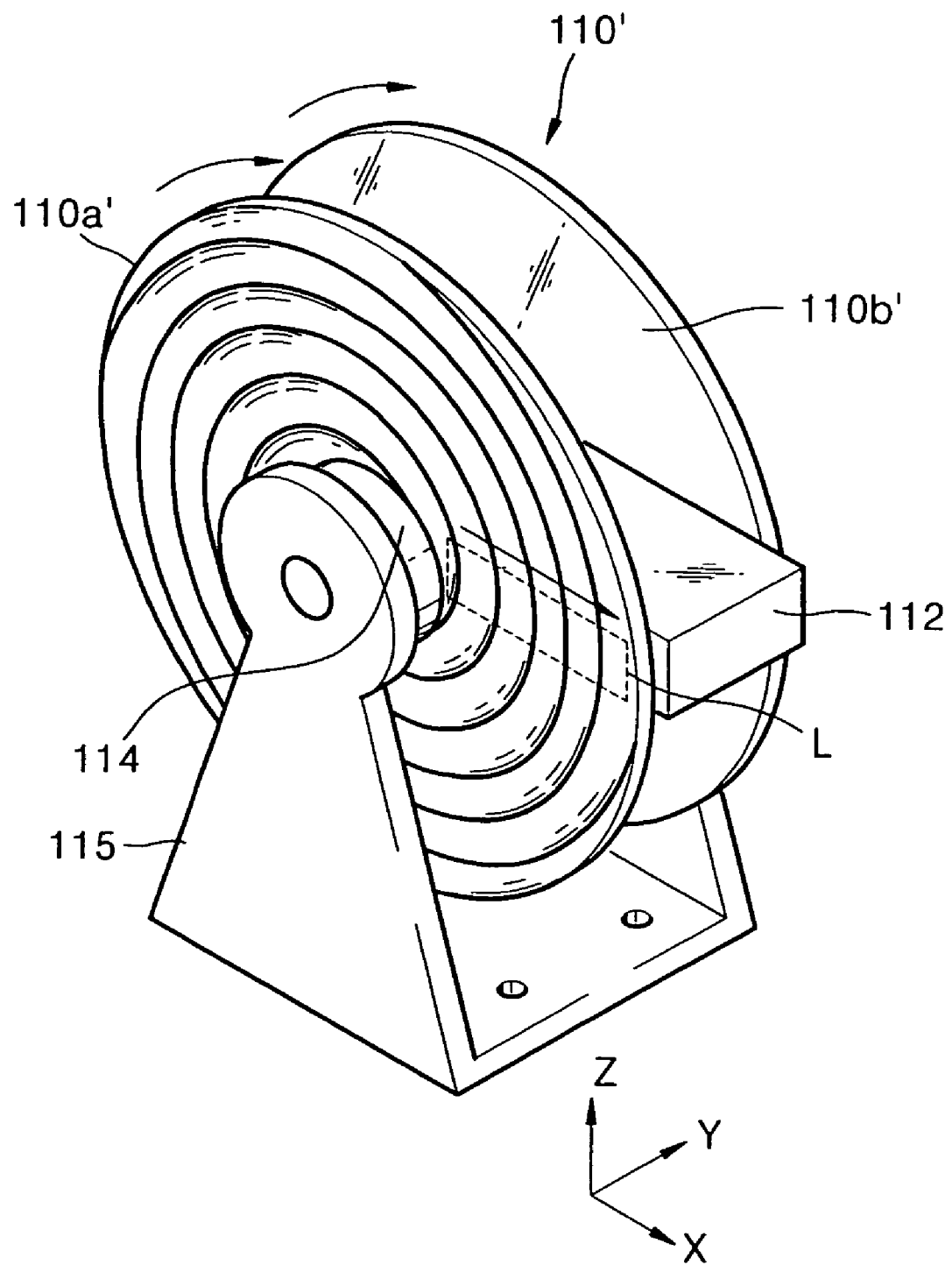
FIG. 5 is a perspective view of an alternate scrolling unit according to the exemplary embodiment of FIG. 2.

As shown in FIG. 5, the scrolling unit 110' includes first and second disks 110a' and 110b' disposed a predetermined distance apart from each other. The first disk 110a' is formed by spirally arranging at least one lens cell 111 and scrolls an incident beam. The second disk 110b' is also formed by spirally arranging at least one lens cell 111 as in the first disk 110a' so as to correct the divergence angle of light emitted from the first disk 110a'. Each of the first and second disks 110a' and 110b' is substantially the same as the single disk of the scrolling unit 110 of FIG. 3.

Preferably, but not necessarily, a glass rod 112 is installed between the first and second disks 110a' and 110b' so as to adjust the divergence angle of light emitted from the first disk 110a'. The use of the glass rod 112 enables a beam focused by the lens cells of the first disk 110a' to be transferred to the second disk 110b' without diverging.

The first and second disks 110a' and 110b' are supported by a bracket 114 so that they can be rotated at a uniform speed by a driving source 115.

As described above, the scrolling unit 110 may be formed by disposing two disks, on each of which at least one lens cell is spirally arranged, on a single driving axis so that color scrolling is performed. Of course, in this case, the scrolling speed of color bars can be kept constant. The scrolling unit 110 may have various other structures. For example, the scrolling unit 110 may be a cylinder on the outer circumference of which lens cells are spirally arranged.

A feature of the projection system of the present invention is that the scrolling unit 110 is formed by a single element that can scroll a plurality of color beams.

As illustrated in FIG. 2, when the dichroic filters 120B, 120G, and 120R of the color separator 120 are installed in parallel to each other, the scrolling unit 110 can be installed between the light source 100 and the color separator 120. Accordingly, a beam emitted from the light source 100 is focused by the scrolling unit 110 and thereafter separated according to color by the color separator 120. Light paths of the separated color beams have different lengths due to selective reflection by the dichroic filters 120B, 120G, and 120R of the color separator 120. Hence, the separated color beams can enter the first fly-eye lens 131 without being mixed.

On the other hand, if the dichroic filters 120B, 120G, and 120R of the color separator 120 are disposed aslant at different angles with respect to each other, or if an optical pipe is used as the color separator 120, the scrolling unit 110 may be disposed between the color separator 120 and the light valve 140.

The lens cells of the first fly-eye lens 131 correspond one-to-one with those of the second fly-eye lens 135, and the lens cells of each of the first and second fly-eye lenses 131 and 135 correspond one-to-one with the lens cells 111 of the scrolling unit 110.

The first fly-eye lens 131 is located at or around a focal plane of the scrolling unit 110 so that the color beams separated by the dichroic filters 120B, 120G, and 120R of the color separator 120 can be incident upon each of the lens cells of the first fly-eye lens 131 without mixing.

In this case, the separated color beams, having different light path lengths due to the distance between adjacent dichroic filters, are incident upon different locations of each of the lens cells of the first fly-eye lens 131.

As the color beams pass through the first fly-eye lens 131, they diverge and then are focused on and collimated by the second fly-eye lens 135.

The relay lens 137 transmits the collimated color beams from the first and second fly-eye lenses 131 and 135 so that they land on different locations on the light valve 140 and form color bars. In FIG. 2, the relay lens 137 is a single lens. However, the relay lens 137 may be a lens group of two or more lenses.

When the first and second fly-eye lenses 131 and 135 and the relay lens 137 are included, light converged by each of the lens cells 111 of the scrolling unit 110 is transmitted to a corresponding lens cell of each of the first and second fly-eye lenses 131 and 135, and the transmitted light lands on the light valve 140 via the relay lens 137 to form bars of different colors on the light valve 140.

The first cylindrical lens 105 reduces the width of a beam emitted from the light source 100 and transmits the beam with a reduced width to the scrolling unit 110. The second cylindrical lens 107 restores the width of the beam transmitted by the scrolling unit 110 to its original state.

When the first cylindrical lens 105 is installed in front of the scrolling unit 110 and reduces the width of a light beam emitted from the light source 100 so that the beam having a box-shaped cross-section as illustrated in FIG. 3 passes through the scrolling unit 110, an effect is obtained whereby the beam L appears to pass through a cylindrical lens array that moves rectilinearly.

Hence, as the scrolling unit 110 rotates at a constant speed, the R, G, and B beams obtained by the color separator 120 are scrolled repeatedly, and thus, the color bars on the light valve 140 are scrolled.

Figure 6A:
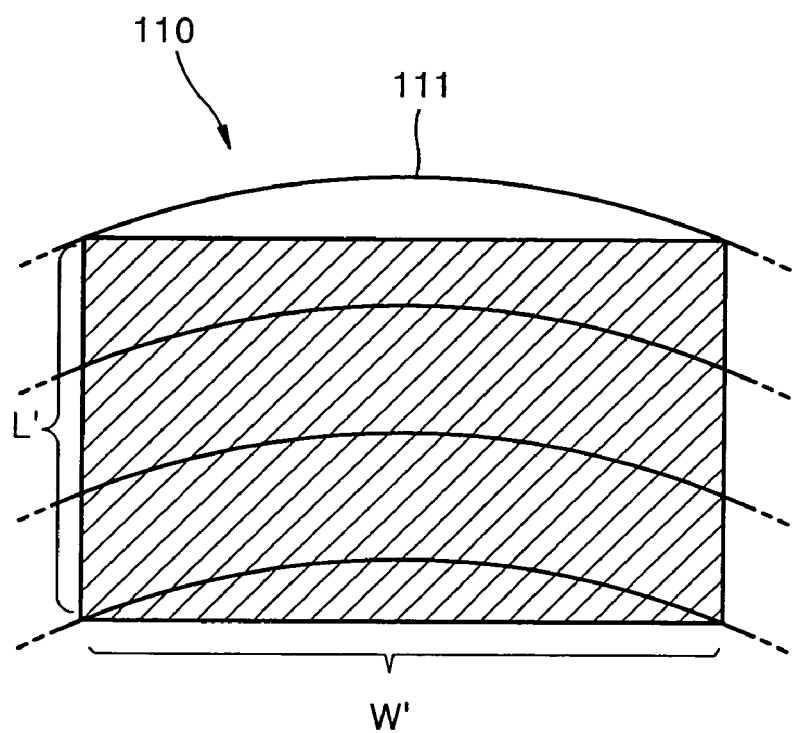
FIG. 6A illustrates the width of a beam that is emitted from a light source and is incident on a scrolling unit without change in width.
Figure 6B:
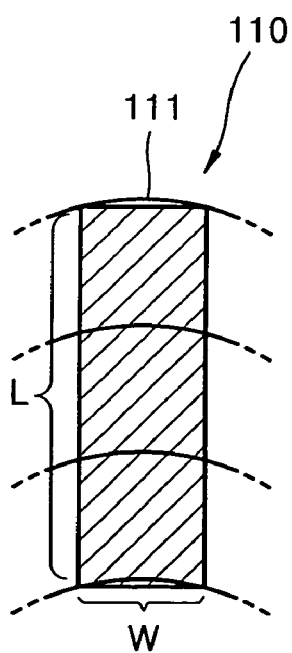
FIG. 6B illustrates the width of a beam that is emitted from the light source, reduced in width by a first cylindrical lens, and then incident upon the scrolling unit.

FIG. 6A shows the cross-section of a beam L' incident on the scrolling unit 110 without passing through the first cylindrical lens 105. Beam L' has a width W'. FIG. 6B shows the cross-section of a beam L that has a width W reduced by the first cylindrical lens 105 and which is then incident upon the scrolling unit 110. In the case of the beam L', that is, when a beam passing through the scrolling unit 110 is relatively wide, the curved shape of the spiral lens cell 111 does not match with that of the beam L', and thus there is light loss.

To minimize the light loss, the first cylindrical lens 105 is provided to produce the beam L with a reduced width, as shown in FIG. 6B. The shape of the spiral lens cell 111, as shown in FIG. 6B, aligns more closely with that of the beam L. Consequently, the light loss is reduced by the use of the first cylindrical lens 105.

In other words, the light loss can be reduced by controlling the width of a beam using first and second cylindrical lenses 105 and 107.

Referring back to FIG. 2, the projection system preferably, but not necessarily, further includes a polarization conversion system (PCS) 136 for converting an approximately unpolarized light beam emitted from the light source 100 into a light beam with a single linear polarization. In FIG. 2, the PCS 136 is disposed between the second fly-eye lens 135 and the relay lens 137. However, the position of the PCS 136 may vary. For example, the PCS 136 may be disposed between the light source 100 and the scrolling unit 110, between the spatial filter 104 and the collimating lens 106.

For example, the PCS 136 may comprise a polarization beam splitter (PBS), a reflection member, and a half waveplate, such as disclosed in U.S. Patent Publication No. 2002/0191154 A1.

Due to the use of the PCS 136, almost all the light emitted from the light source 100 can be used, thus increasing light efficiency.

The projection system preferably, but not necessarily, further includes a PBS 150, which transmits or reflects incident light according to polarization in order to direct light received from the illumination system toward the light valve 140 and to direct light reflected by the light valve 140 toward a projection lens unit 155.

For example, the PBS 150 transmits a light beam having a first linear polarization of the light received from the illumination system so that the light beam with the first linear polarization can advance toward the light valve 140. Also, the PBS 150 reflects a light beam having a second linear polarization, which is orthogonal to the first linear polarization, of light reflected by the light valve 140 so that the light beam with the second linear polarization can advance toward the projection lens unit 155.

At least one polarizing element, for example one of polarizing elements 151 and 153, is preferably, but not necessarily, installed to transmit only light with a specific polarization in order to increase the color purity and contrast of an image.

The polarizing element 151 and/or 153 is disposed between the light source 100 and the PBS 150 and/or between the light valve 140 and the projection lens unit 155.

In FIG. 2, the polarizing elements 151 and 153 are disposed respectively between the light source 100 and the PBS 150 and between the light valve 140 and the projection lens unit 155.

The polarizing element 151, disposed between the light source 100 and the PBS 150, serves as a polarizer so that only light with the first linear polarization is incident upon the PBS 150. The polarizing element 153, disposed between the light valve 140 and the projection lens unit 155, serves as an analyzer so that only light with the second linear polarization is transmitted toward the projection lens unit 155.

Although the PCS 136 is included in the projection system according to the present invention, the light incident upon the PBS 150 is not 100% polarized in a first linear direction. Consequently, if the polarizing element 151 and/or 153 is included to serve as a polarizer and/or an analyzer, the color purity and contrast of an image can be improved.

In the projection system according to the present invention, each of the polarization elements 151 and 153 is preferably, but not necessarily, non-absorption polarizing elements. These elements transmit light having one polarization (a desired polarization) and reflect light having the other polarization (an undesired polarization). The non-absorption polarizing element may be a wire grid polarizer, such as disclosed in U.S. Pat. No. 6,122,103, or a reflective polarizer disclosed in U.S. Pat. No. 6,025,897. Alternatively, the non-absorption polarizing element may be a general PBS.

Alternatively, each of the polarization elements 151 and 153 may be an absorption polarizing element which transmits light having one polarization (a desired polarization) and absorbs light having the other polarization (an undesired polarization).

A non-absorption polarizing element, such as, a wire grid polarizer or a reflective polarizer, may be used not only as a polarizer and/or an analyzer but also as a PBS (not shown) of the PCS 136. Also, the wire grid polarizer may be used as the PBS 150.

The light valve 140 processes incident color beams according to an input image signal, thereby forming a color image.

In the projection system according to the present invention, the light valve 140 is preferably, but not necessarily, a reflective display, for example, a reflective LCD such as a reflective Liquid Crystal on Silicon (LCOS).

Color bars formed on the light valve 140, for example, R, G, and B color bars, are scrolled as the scrolling unit 110 rotates. When the image information for each of the pixels of the light valve 40 is processed in synchronization with the motion of the color bars, a color image is formed. The color image formed by the light valve 140 is magnified by the projection lens unit 155 and projected onto a screen 260.

Figure 7:
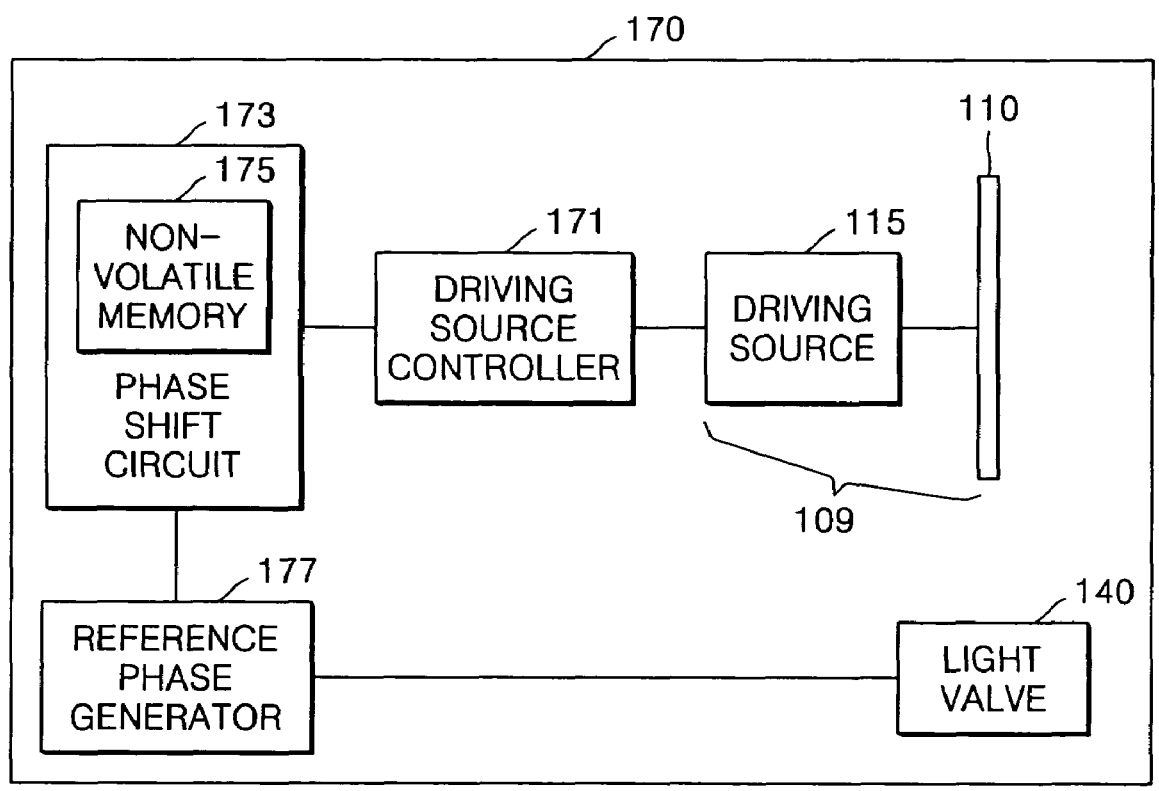
FIG. 7 is a block diagram of a control circuit in the color scrolling projection system of FIG. 2.

FIG. 7 is a schematic block diagram of an embodiment of the control circuit 170. Referring to FIG. 7, the control circuit 170 matches the phase of the optical scanning of the color bars on the light valve 140 due to a rotation of the scrolling unit 110 with the phase of the electrical scanning of an image signal received by the light valve 140. Hence, the R, G, and B color bars are scrolled in synchronization with the image signal, which controls the light valve 140 on a pixel-by-pixel basis.

As shown in FIG. 7, the control circuit 170 includes a driving source controller 171 for controlling the driving source 115. The driving source controller 171 changes the rotation of the driving source 115 according to a phase offset value, which represents a difference between the phases of an optical scanning of color bars and an electrical scanning, so that the phase of the optical scanning of color bars due to scrolling of the color scanner 109 can match with that of the electrical scanning of the image signal received by the light valve 140.

The control circuit 170 further includes a reference phase generator 177 for generating a reference phase signal and providing the same to the light valve 140. The light valve performs electrical scanning of image information based on the reference phase signal and determines the phase offset value.

The reference phase generator 177 generates the reference phase signal (i.e., a synchronization signal or a timing signal), which represents time information to be provided to the color scanner 109 and the light valve 140. The reference phase generator 177 provides the reference phase signal to the light valve 140 so that the electrical scanning is performed based on the reference phase signal, and also provides the reference phase signal to a phase shift circuit 173 located between the reference phase generator 177 and the driving source controller 171.

The phase shift circuit 173 stores a phase shift value (i.e., a phase offset value) added to or subtracted from the reference phase signal provided by the reference phase generator 177 in a non-volatile memory 175. The driving source controller 171 accesses the phase offset value stored in the non-volatile memory 175.

When the driving source controller 171 accesses the phase offset value and controls the driving source 115 according to the phase offset value, electrical scanning and optical scanning can be synchronized with each other.

In other words, since the electrical scanning in the light valve 140 is performed according to the reference phase signal, and the phase offset value representing the phase difference between the electrical scanning and optical scanning is obtained based on the reference phase signal, the electrical scanning and optical scanning can be made in phase with each other by driving the scrolling unit 110 according to the phase offset value.

A process of making the optical scanning in phase with the electrical scanning using the control circuit 170 will now be described.

The reference phase generator 177 provides a reference phase signal (e.g., a synchronization signal or a timing signal), which represents time information to be used upon the optical and electrical scanning, to the light valve 40 and the phase shift circuit 173.

In response to the reference phase signal sent to the light valve 140 and the phase shift circuit 173, the light valve 140 executes electrical scanning of the color image information and the optical scanning of a plurality of color bars is executed by the scrolling unit 109.

The phase shift value representing the phase difference between optical and electrical scannings performed on the light valve 140 is determined by the following method.

The scanning phase of the color bars on the light valve 140 is adjusted until each color bar is modulated only by image information corresponding to the particular color.

As the color bars are scrolled, light corresponding to a specific color bar illuminates a pixel of the light valve 140 for a predetermined interval, and thereafter the color of the light is scrolled and changes. The interval at which the color of light is changed depends on both the number of lens cells 111 of the scrolling unit 110 and the rotating speed of the driving source 115 (i.e., the rotation speed of the scrolling unit 110). In the projection system according to the present invention, R, G, and B color bars, for example, are scrolled on the light valve 140 by the single color scanner 109, so that the colors are scrolled at identical intervals.

As discussed, the scanning phase of each color bar is adjusted until the light of each color is modulated only by image information corresponding to that particular color, and each color must have a minimum brightness. The phase of scanning of a color bar on the light valve 140 is adjusted by changing a rotation of the driving source 115 using the driving source controller 171. The amount of the phase adjusted upon scanning of a color bar is equal to the phase difference between the electrical scanning and the optical scanning of that specific color bar, determined by the reference phase signal.

The phase difference between the electrical scanning and the optical scanning of the color bars is the phase shift value by which the phase of the optical scanning of color bars is shifted based on the electrical scanning of the light valve 140 by the image signal. The phase shift value is stored in the non-volatile memory 175 of the phase shift circuit 173.

As discusses, in a projection system of the present invention, the plurality of color bars are scrolled on the light valve 140 by the single color scanner 109, so all of the color bars are scanned at identical intervals and identical speeds that depend on the rotation speed of the driving source 115 and the number of lens cells 111. Also, the duration during which each color bar scans a specific pixel of the light valve 140 depends on the structure of an optical system, including, for example, the spatial filter 104, which determines the width of each color bar. Therefore, even when the phase shift value of only one color bar is determined and the rotation of the driving source 115 is changed according to that phase shift value, the electrical scanning is maintained in phase with the optical scanning for all colors.

A phase shift value representing the phase difference between the electrical scanning and the optical scanning of each color bar is determined through the process of adjusting the scanning phase of each color bar. The phase shift value is stored in the non-volatile memory 175 of the phase shift circuit 173 and may be used to render in phase the electrical scanning and the optical scanning of each color bar. Of course, since a plurality of color bars are scrolled on the light valve 140 by the single color scanner 109 in the projection system of the present invention, phase shift values representing the phase differences between the electrical scanning and the optical scanning of all of the color bars can be determined easily. Also, by using the single color scanner 109, the optical scanning of each color bar can be rendered in phase with the electrical scanning of each color bar according to a simple method.

As described above, in the projection system of the present invention, the light valve 40 is electrically scanned based on the reference phase signal, and a phase difference between electrical scanning and optical scanning of the light valve 140 is determined on the basis of the reference phase signal. When the phase of optical scanning is shifted by changing the rotation of the driving source 115 using the phase difference, the electrical scanning and optical scanning of the light valve 140 are in phase. Accordingly, although the scrolling unit 110 is smoothly installed on the shaft of the driving source 115, the optical scanning of the light valve 140 due to color bar scrolling by the scrolling unit 110 can be in phase with the electrical scanning of the light valve 140. The installation of the scrolling unit 110 on the shaft of the driving source 115 is easy, so the manufacturing costs of a projection system are greatly reduced.

Figure 8:
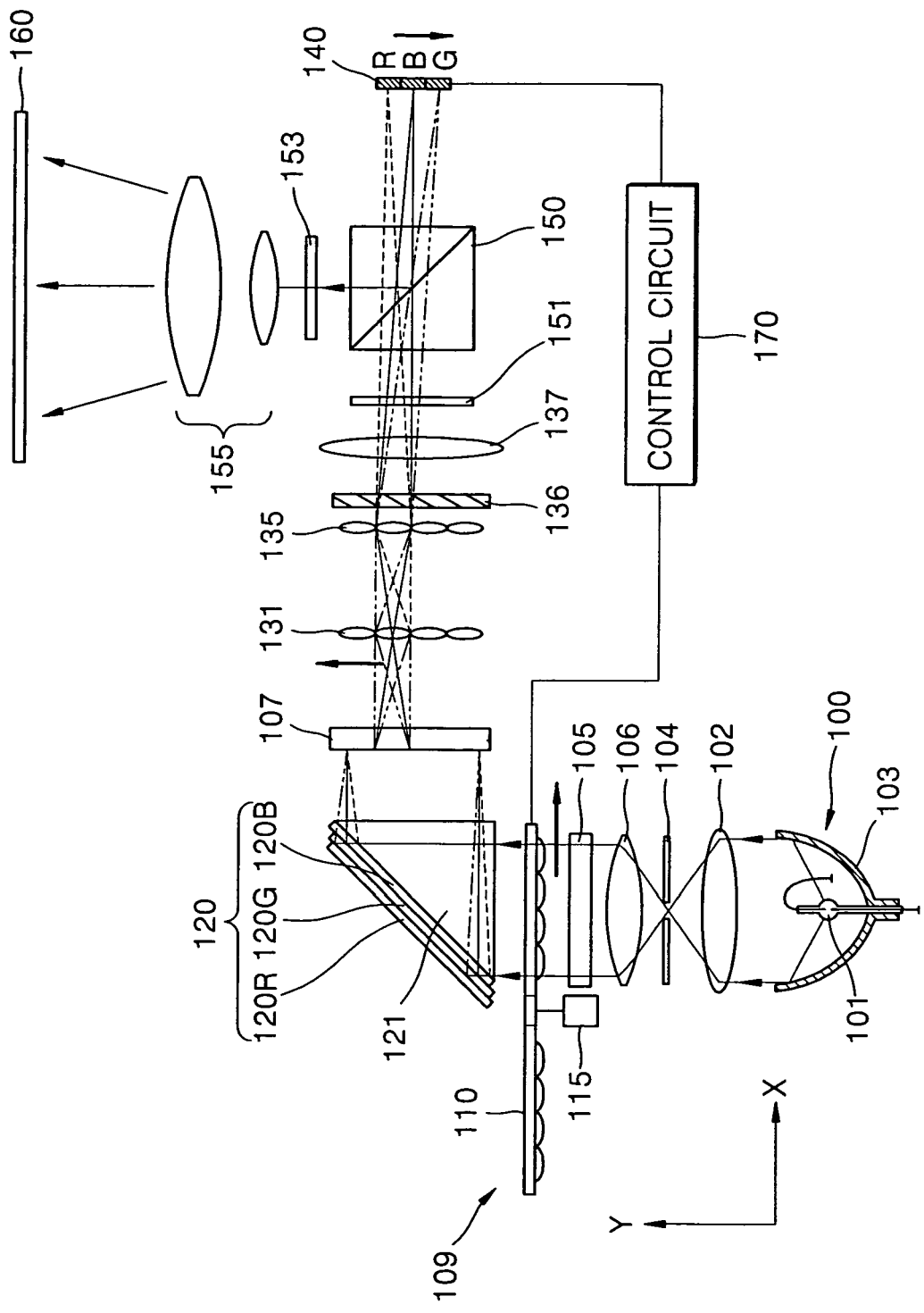
FIG. 8 illustrates color scrolling in the projection system of FIG. 2.

The operation of the projection system of FIG. 2 will now be described with reference to FIG. 8.

First, approximately unpolarized white light emitted from the light source 100 is focused by the lens 102, and the incidence angle or etendue of the focused light is adjusted by the spatial filter 104. Light transmitted by the spatial filter 104 is collimated by the collimating lens 106. The width of the collimated light is reduced by the first cylindrical lens 105, and light with the reduced width is incident upon the scrolling unit 110.

Light transmitted by the scrolling unit 110 is separated into R, G, and B beams, for example, by the color separator 120. The R, G, and B beams are incident upon different locations of each of the lens cells of the first fly-eye lens 131. The previously reduced width of the light is returned to the original width by the second cylindrical lens 107.

After the R, G, and B beams are transmitted by the first fly-eye lens 131, they diverge. The divergent R, G, and B beams are combined and collimated by the second fly-eye lens 135 to form a parallel beam.

The parallel R, G, and B beams are changed to R, G, and B beams having a single linear polarization by the PCS 136. The R, G, and B beams having a single linear polarization pass through the relay lens 137 and are incident upon different locations on the light valve 140, thereby forming R, G, and B color bars.

More specifically, only a light beam with a first linear polarization is transmitted by the polarizing element 151, which serves as a polarizer, and is again transmitted by the PBS 150 toward the light valve 140. When the light valve 140 is a polarization-dependent display device, such as a reflective LCD, the polarization of a light beam reflected by the light valve 140 is changed according to an image signal. Hence, a light beam with a second linear polarization is reflected by the PBS 150, passes through the polarizing element 153, which serves as an analyzer, and is directed toward the projection lens unit 155. The light beam with the second linear polarization is magnified by the projection lens unit 155 and projected onto the screen 160.

The R, G, and B color bars formed on the light valve 140 are scrolled with a rotation of the scrolling unit 110.

As the scrolling unit 110, on which at least one lens cell is spirally arranged, rotates clockwise, the area of the lens array through which light passes appears to rectilinearly move outward. Hence, if color bars are first formed on the light valve 140 in a G, B, and R order, locations on the first fly-eye lens 131 upon which the G, B, and R beams are incident change with the rotation of the scrolling unit 110, and accordingly, the G, B, and R order changes to a B, R, and G order. The B, R, and G order changes to the R, G, and B order, and the R, G, and B order changes to the G, B, and R order. Such scrolling is repeated periodically.

Hence, when the scrolling unit 110 is rotated in synchronization with an image signal which controls the light valve 140 on a pixel-by-pixel basis, the G, B, and R color bars are scrolled to form a color image.

The driving source controller 171 of the control circuit 170 controls the driving source 115 so that the scrolling of R, G, and B color bars upon rotation of the scrolling unit 110 is synchronized with the image signal that controls the light valve 140 on a pixel-by-pixel basis. Thus, the optical scanning of the color bars on the light valve 140 is in phase with the electrical scanning of the light valve 140.

Figure 1:
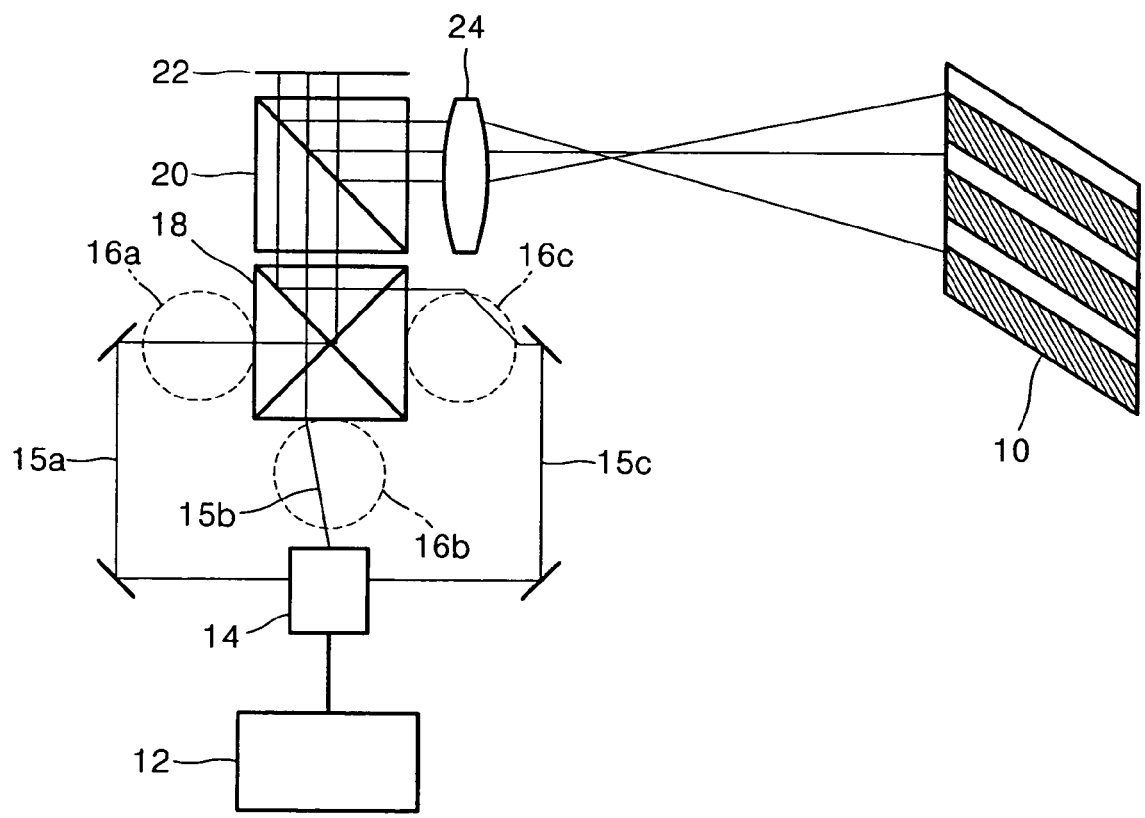
FIG. 1 is a schematic diagram of a conventional color scrolling projection system disclosed in International Publication No. WO 02/085031 A1.

If the scrolling unit 110 of the projection system of the present invention has an appropriate number of spiral lens cells, for example, four or more spiral lens cells, the projection system can sufficiently display a color image even when the driving source 115 is rotated more slowly than a conventional color wheel or the conventional prisms of FIG. 1 are rotated to perform color scrolling in a conventional projection system.

Table 1 shows the rotation speeds of the driving source 115 for: a) a conventional color wheel projection system, b) the conventional projection system of FIG. 1 using prisms to perform color scrolling, and c) the projection system according to the exemplary embodiment of FIG. 2 when the light valve 140 operates at 60 Hz.

TABLE 1

| | Rotation speed of driving source |
|---|---|
| Conventional color wheel projection system | When a light valve displays each of R, G, and B color images at 60 Hz, a driving source (i.e. a single color wheel) rotates at 10800 rpm. |
| Conventional projection system of FIG. 1 | To display each of R, G, and B color images at 60 Hz, each of the prisms rotates at 3600 rpm. |
| Projection system according to the exemplary embodiment of FIG. 2 | When a scrolling unit has 4 spiral lens cells, the scrolling unit rotates at 2700 rpm (=10800/4). When a scrolling unit has 8 spiral lens cells, the scrolling unit rotates at 1350 rpm (=10800/8). |

As shown in Table 1, the driving source 115, of a conventional color wheel projection system, must rotate a color wheel at 10800 rpm to display all of the R, G, and B color images at 60 Hz.

In the conventional projection system using the prisms of FIG. 1 to achieve color scrolling, each of the prisms must be rotated at 3600 rpm in order to display color images at 60 Hz.

If the scrolling unit 110 of the projection system of FIG. 2 has four spiral lens cells arranged at identical intervals as shown in FIG. 3, color scrolling is performed four times per rotation of the scrolling unit 110. Hence, the scrolling unit 110 can sufficiently achieve four color scrolling operations per rotation by rotating at only 2700 rpm.

Figure 9:
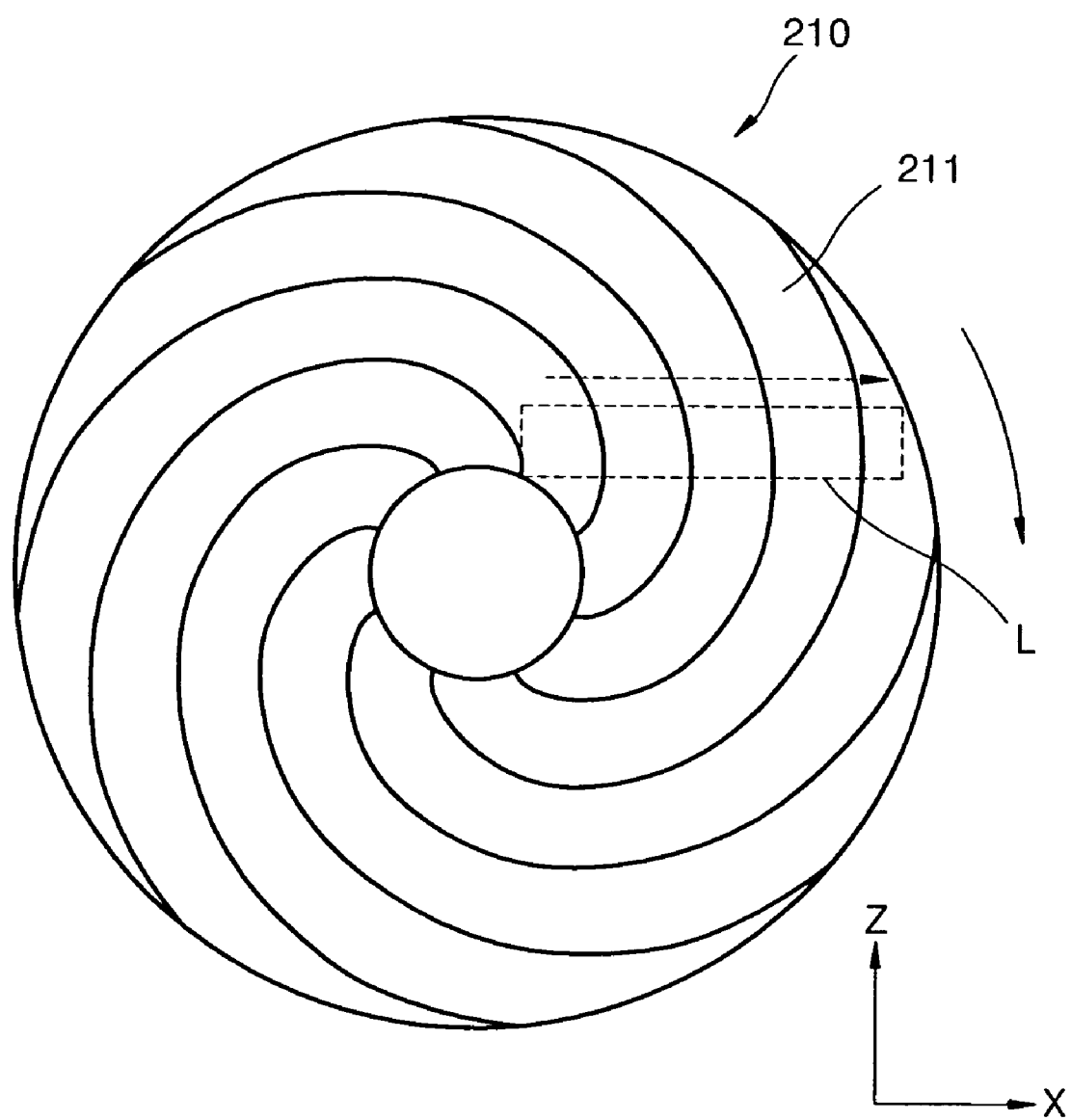
FIG. 9 is a front view of another alternate scrolling unit according to the exemplary embodiment of FIG. 2.

If the projection system of the present invention uses a scrolling unit 210 having 8 spiral lens cells arranged at identical intervals as shown in FIG. 9, color scrolling is performed eight times per rotation of the scrolling unit 210. Hence, the scrolling unit 210 can sufficiently achieve eight color scrolling operations per rotation by only rotating at 1350 rpm.

Accordingly, when the scrolling unit 110 of the projection system according to the present invention includes four or more spiral lens cells, color scrolling can be sufficiently achieved even by rotating the driving source 115 more slowly than in conventional projection systems.

As described above, a projection system according to the present invention scrolls a plurality of color bars using a single color scanner including a driving source and a scrolling unit designed to convert a rotation of at least one lens cell into a rectilinear motion of a lens array through which light passes. Thus, the color bars are scrolled at a constant speed, and continuous, consistent color scrolling can be achieved. Consequently, scrolling of the color bars, for example, R, G, and B color bars can be easily synchronized with driving of a light valve, and the size of the projection system can be reduced.

Also, since the projection system of the present invention utilizes a single color scanner to scan a plurality of color bars, the color bars move at identical speeds, and the quality of the resultant color image can be improved.

Furthermore, when the scrolling unit of the projection system according to the present invention includes an appropriate number of spiral lens cells, for example, four or more spiral lens cells, the projection system according to the present invention can sufficiently color scrolling even by rotating a driving source slower than in a conventional color wheel projection system or a conventional projection system using prisms to perform color scrolling.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projection system, comprising:
   a light source;
   a color scanner including a scrolling unit and a driving source for rotating the scrolling unit so that a plurality of color bars are scrolled, wherein the scrolling unit includes a plurality of spirally-arranged lens cells and converts a rotation of the plurality of spirally-arranged lens cells into a rectilinear motion of a lens array of the scrolling unit through which light passes;
   a light valve, which electrically scans the plurality of color bars according to an input image signal;
   a control circuit, which renders optical scanning of at least one of a plurality of color bars in phase with electrical scanning of the light valve by an image signal, wherein the color bars are formed on the light valve due to a rotation of the scrolling unit; and
   a color separator, disposed between the color scanner and the light valve, which separates light from said light source according to color.

2. The projection system of claim 1, wherein the control circuit comprises a driving source controller which controls the driving source so that the optical scanning of the at least one color bar is in phase with the electrical scanning by changing a rotation of the driving source according to a phase offset value which represents a phase difference between the optical scanning and the electrical scanning.

3. The projection system of claim 2, wherein:
   the control circuit further comprises a reference phase generator which generates a reference phase signal and provides the reference phase signal to the light valve; and
   the electrical scanning of the light valve is performed based on the reference phase signal, and the phase offset value is determined based on the reference phase signal.

4. The projection system of claim 3, wherein the phase offset value is determined by the steps of:
   providing an electrical scanning including image information for all colors to the light valve based on the reference phase signal;
   scanning the plurality of color bars on the light valve based on the reference phase signal; and
   adjusting phases of scanning of the color bars on the light valve until a bar of a specific color bar is modulated by only image information corresponding to the specific color.

5. The projection system of claim 4, wherein the phase offset value is stored in a non-volatile memory accessible by the controller.

6. The projection system of claim 3, wherein the phase offset value is stored in the non-volatile memory accessible by the controller.

7. The projection system of claim 2, wherein the phase offset value is stored in a non-volatile memory accessible by the controller.

8. The projection system of claim 1, wherein the plurality of spirally-arranged lens cells of the scrolling unit are cylindrical lenses.

9. The projection system of claim 1, wherein the scrolling unit is a disk.

10. The projection system of claim 1, wherein the plurality of spirally-arranged lens cells are at least four spirally-arranged lens cells.

11. The projection system of claim 1, wherein the plurality of color bars are scrolled by a rotation of the scrolling unit by the driving source such that when the scrolling unit rotates, a lens array of lens cells through which light passes appears to move rectilinearly in a direction toward or away from a rotation center of the scrolling unit.

12. The projection system of claim 1, further comprising first and second fly-eye lenses which are installed between the scrolling unit and the light valve and which each comprising a plurality of lens cells which correspond one-to-one with the lens cells of the scrolling unit.

13. The projection system of claim 12, further comprising a relay lens which is installed between the second fly-eye lens and the light valve and which transmits light beams passed through the second fly-eye lens so that light beams of different colors are focused on different locations of the light valve.

14. The projection system of claim 12, further comprising a plurality of cylindrical lenses, disposed respectively in front of and behind the scrolling unit so as to adjust the width of a light beam incident upon the scrolling unit.

15. The projection system of claim 1, further comprising a plurality of cylindrical lenses, disposed respectively in front of and behind the scrolling unit so as to adjust the width of a light beam incident upon the scrolling unit.

16. The projection system of claim 1, wherein the color separator separates the light from the light source by selectively reflecting the light beam according to wavelength.

* * * * *